United States Patent
Koepff et al.

(10) Patent No.: US 6,572,209 B2
(45) Date of Patent: Jun. 3, 2003

(54) DRIVE FOR OPENING AND CLOSING A COVER MEMBER IN A MOTOR VEHICLE

(75) Inventors: Ralf Koepff, Dornstetten (DE); Steffen Breunig, Elztal (DE)

(73) Assignees: Fishcherwerke Artur Fischer GmbH & Co., KG, Waldachtal (DE); DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/834,810

(22) Filed: Apr. 13, 2001

(65) Prior Publication Data

US 2002/0020114 A1 Feb. 21, 2002

(30) Foreign Application Priority Data

Apr. 20, 2000 (DE) .......................... 100 19 564
Sep. 8, 2000 (DE) .......................... 100 44 557

(51) Int. Cl.[7] .............................. A47B 88/00
(52) U.S. Cl. ................ 312/319.5; 312/319.8; 312/322; 312/323; 74/527; 74/529
(58) Field of Search .......... 312/319.5, 319.8, 312/322, 323, 319.6, 319.7; 296/37.8, 37.12, 117; 74/527, 529, 531, 10.41, 10.1, 413.25, 475; 81/60, 467, 177.5; 464/32, 37, 38, 45; 49/322, 323, 324, 334, 340, 339, 346

(56) References Cited

U.S. PATENT DOCUMENTS 2,511,734 A * 6/1950 Murphy ................ 192/56.5
3,060,763 A * 10/1962 Neufeld et al. ............ 74/524
4,121,483 A * 10/1978 Sedlock ................... 137/71
4,344,729 A * 8/1982 Orsinger et al. ........... 271/268
4,786,098 A * 11/1988 Jobmann et al. ......... 296/37.12
5,184,489 A * 2/1993 Squires et al. ........... 296/37.12
5,480,015 A * 1/1996 Yang ...................... 192/150
6,012,785 A * 1/2000 Kawasaki ................. 312/29
6,241,300 B1 * 6/2001 Suzuki .................... 296/37.12

FOREIGN PATENT DOCUMENTS

DE        40 36 900 A1     5/1992
DE        197 44 908 A1    4/1999
JP        404090940 A  *   3/1992
JP        405038981 A  *   2/1993

* cited by examiner

Primary Examiner—Lanna Mai
Assistant Examiner—John Fitzgerald
(74) Attorney, Agent, or Firm—Michael J. Striker

(57) ABSTRACT

A drive for opening and closing a cover member in a motor vehicle has a lever which includes a detent device, for example a spring-loaded pin, which is pressed into a detent notch by force of a spring and is disengageable when a predetermined force is exceed and as a result disconnects an electric motor for opening and closing said cover member. It is therefore possible to open the cover member even when the electric motor fails, by disengaging the lever by hand, and the lever forms an overload safety device for the electric motor in the event of the cover member becoming jammed.

5 Claims, 2 Drawing Sheets

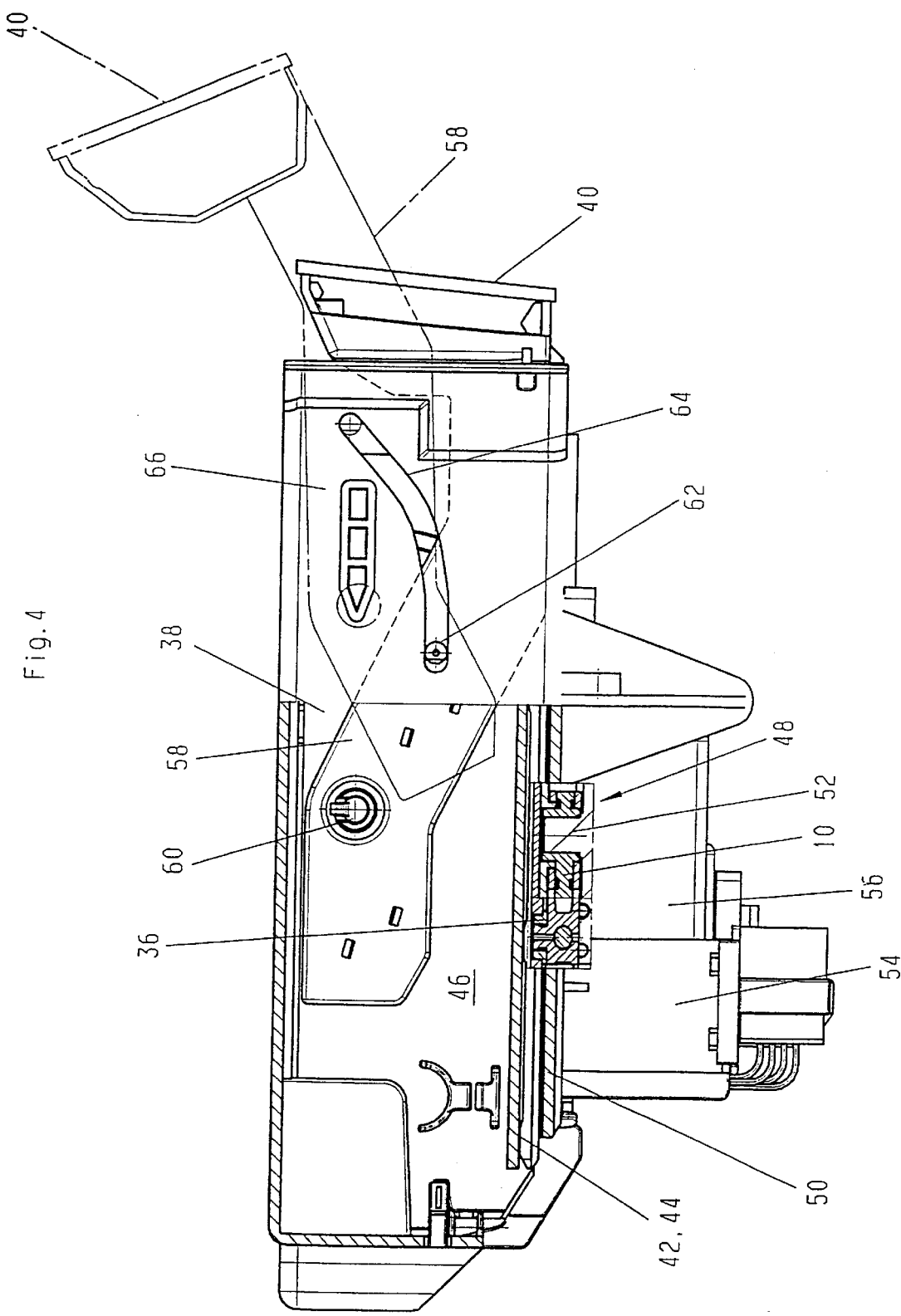

DRIVE FOR OPENING AND CLOSING A COVER MEMBER IN A MOTOR VEHICLE

BACKGROUND OF THE INVENTION

The invention relates to a drive for opening and closing a cover member in a motor vehicle.

The cover member is provided especially as a cover member of a glove compartment or other storage compartment in a motor vehicle and/or as a covering for a car radio, CD player or some other similar device built into the motor vehicle. Operating elements of the motor vehicles can be incorporated in the cover member, such as, for example, controls or switches for seating-heating, a warning light system and the like, that have to be, or should be, accessible at all times, that is to say when the cover member is open and when it is closed. The cover member is in principle closed and is opened only as required, for example at the touch of a button, by an electric motor so that in the event of an accident no objects can fall out of the storage compartment.

The drive according to the invention comprises an electric motor that moves the cover member, which is also associated with the drive, by way of a path transmission element, for example a pushing and pressure-applying rod. The problem arises, for example in the event of a power failure, defective control of the drive, a defect in the electric motor or in a reduction gear system, when present, that the cover member cannot be opened. It may be important, however, to be able to open the cover member also in such cases in order, for example, to be able to remove objects contained in a storage compartment that is closed by the cover member, such as important medication, documents or the like.

SUMMARY OF THE INVENTION

Accordingly, it is an object the present invention to provide a drive for opening and closing a cover member in a motor vehicle, which avoids the disadvantages of the prior art.

More particularly, it is an object of the present invention to provide the drive for opening and closing the cover member in a motor vehicle, such that it is possible to open the cover member when the drive fails.

In keeping with these objects and with others which will become apparent hereinafter, one feature of present invention resides, briefly stated, in a drive which has a disconnecting device, which disconnects the cover member from the electric motor when a predetermined force acting upon the cover member is exceeded. As a result, the cover member can be opened by hand without movement of the electric motor. The disconnecting device according to the invention, for example, can disconnect the path transmission element from the electric motor or may disable the path transmission element itself.

The invention has the advantage that the cover member can be opened by hand independently of the electric motor. A further advantage of the invention is that the disconnecting device forms an overload protection for the electric motor, which disconnects the cover member from the electric motor if the cover member becomes jammed when the electric motor is running.

The disconnecting device can, for example, be in a form providing frictional engagement and can transmit a limited force or a limited moment normally sufficient to open and close the cover member. In an embodiment of the invention, a detent element is provided as disconnecting device, which disengages when the predetermined force is exceeded and as a result disconnects the drive of the cover member mechanically from the electric motor. This has the advantage that the force required for disconnection can be set relatively precisely and can be maintained in mass production. A further advantage is that, after the detent element has disengaged, the cover member can be moved smoothly. There is also the advantage that the detent element can be re-engaged after the drive has been rectified, and the drive according to the invention is not damaged as a result of the predetermined force being exceeded.

In a special embodiment of the invention, the path transmission element comprises a lever that converts a rotational movement of the electric motor into a translational movement for opening and closing the cover member. At the same time, that lever forms the disconnecting device that disconnects the cover member from the electric motor when the predetermined force is exceeded In a development of the invention, the lever is in the form of a detent element.

In an embodiment of the invention, the detent element comprises a detent body, for example a ball or a pin, which is pressed into a detent notch by a spring element. By overcoming a detent force, the detent body can be disengaged from the detent notch, as a result of which the cover member is disconnected from the electric motor.

In an embodiment of the invention, the drive comprises an insert that is guided displaceably in the manner of a drawer. The insert forms, for example, a storage compartment or a seat for installation a car radio, CD player or the like. The insert can be displaced by the electric motor especially by way of the lever explained above. The insert forms a path transmission element that transmits a drive movement of the electric motor to the cover member, which is connected pivotably to the insert. The cover member comprises a guiding element that moves it sideways when the insert is displaced to a pulled-out position. "Moved sideways" means that the cover member is moved to a position in which the insert is accessible. For that purpose, the cover member can be moved upwards, downwards or sideways. When the insert is pushed in again, the cover member moves back to a closed position in which it covers the insert. That construction of the invention can be achieved together with the disconnecting device according to the invention or without it.

In an embodiment of the invention, the cover member has at least one arm by way of which it is connected pivotably to the insert, for example by means of a pin connection. By way of the pin connection, the cover member can be driven by displacement of the insert.

In a preferred construction, the cover member comprises a slide-type guiding element. A slideway preferably extends at an angle relative to the direction of displacement of the insert and as a result causes the desired sideways movement of the cover member when the insert is pulled out. On insertion of the insert, the slide-type guiding member moves the cover member back to the position in which it closes the insert. The slideway does not have to be straight; for example, it can extend in a curve. The slideway can be arranged in a fixed position, for example in a housing in which the insert is displaceably accommodated. The slideway can also be arranged in the arm of the cover member, and a fixed-position sliding pin, sliding block or the like engages in the slideway.

The invention will be explained hereinafter in greater detail with reference to an embodiment shown in the drawings.

BRIEF DESCRIPTION OF THE DRAWINGS

FIG. 4 is a partially cut-away side view of a drive according to the invention.

DESCRIPTION OF THE PREFERRED EMBODIMENTS

Figure 1:
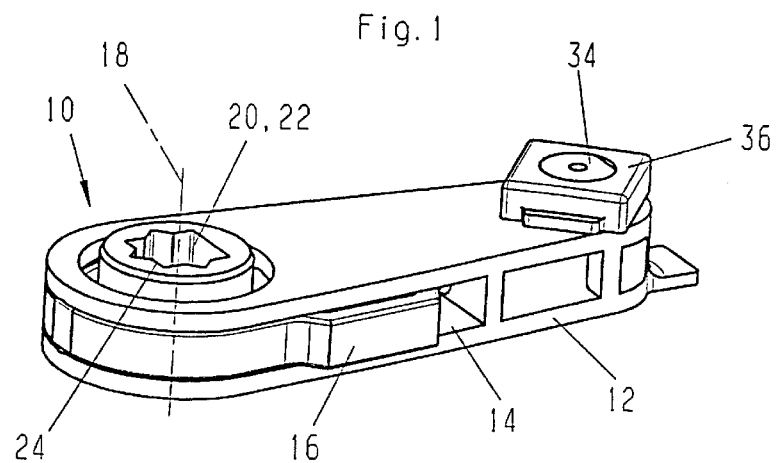
FIG. 1 is a perspective view of a lever of a drive according to the invention.

The drive in accordance with the present invention has a lever 10 shown in FIGS. 1–3 and is explained below with reference to FIG. 4. The lever 10 has a base portion 12 of rectangular cross-section that is low in comparison with its width, the height of which base portion is constant over its entire length and the width of which decreases from one end to the other. the two ends of the base portion 12 are rounded in an arc of a circle (FIG. 3). The base portion 12 is provided with a slit 14 which extends over approximately ⅔ of the length of the lever 10 and passes through the base portion 12 in a plane with the lever 10, that is to say in a transverse direction.

Positioned in the slit 14 in the base portion 12 is a coupling lever 16, which can be rotated about a notional axis of rotation 18 of the lever 10 relative to the base portion 12. Concentrically with the axis of rotation 18, which extends perpendicular to the slit 14, the base portion 12 and the coupling lever 16 inserted therein are pierced by aligned hole 20, 22, the hole 20, 22 in the coupling lever 16 having a serrated profile 24 to enable an interlocking engagement therein, for cojoint rotation, of a motor or gear shaft (not shown in FIGS. 1 to 3).

The base portion 12 and the coupling lever 16 are made of plastics material. In order to reinforce the coupling lever 16, a metal platelet 26 is inserted in the end of the coupling lever that faces the closed end of the slit 14, the metal platelet being indicated by a broken line in FIG. 3. On an edge facing the closed end of the slit 14, the metal platelet 26 has a semi-circular detent notch 28.

In the end of the base portion 12 remote from the coupling lever 16, a spring-loaded pin 30 is inserted. The spring-loaded pin 30 lies in a cylindrical housing 32 and is pressed by a compression spring (not visible in the drawing) that is inside the housing 32 into the detent notch 28 of the metal platelet 26 inserted in the coupling lever 16. The spring-loaded pin 30 and its housing 32 are also indicated in FIG. 3 by broken lines.

On the upper side at the end remote from the axis of rotation 18, the base portion 12 has an upward projecting pin 34, on which there is rotatably positioned a sliding block 36 that is square in plan view.

The lever 10 functions as follows: the lever 10 serves to convert a rotation movement into a linear movement. The rotational movement is transmitted by a motor or gear shaft (not shown in FIGS. 1 to 3) to the coupling lever 16 positioned in the base portion 12. For that purpose, the motor or gear shaft has a serrated profile complementary to the serrated profile 24 of the coupling lever 16, by means of which the motor or gear shaft engages in the coupling lever 16 so that the coupling lever rotates conjointly therewith. By way of the spring-loaded pin 30 that lies in the detent notch 28 of the metal platelet 26 inserted in the coupling lever 16, the rotational movement of the coupling lever 16 is transmitted to the base portion 12 so that the sliding block 36 moves in a circular path. The circular movement of the sliding block 36 can be used to displace an element (not shown in FIGS. 1 to 3) with which the sliding block 36 is in engagement.

If the lever 10 is overloaded, the spring-loaded pin 30 is pressed out of engagement with the detent notch 28 so that the base portion 12 and the sliding block 36 are freely rotatable relative to the coupling lever 16 inside the base portion 12, the coupling lever 16 being arranged to rotate conjointly with the motor or gear shaft (not shown) by way of its serrated profile 24. The purpose of the ability of the base portion 12 to disengage from the coupling lever 16 is firstly that when the lever 10 is jammed at the sliding block 36 the motor can continue to turn and does not become overloaded. Also, when the motor is not turning, for example as a result of a power failure, defect or failure of a motor control system, the base portion 12 can be disengaged from the coupling lever 16 and moved relative to the coupling lever 16 by pulling or pushing the sliding block 36. After such a fault has been overcome, the base portion 12 is re-engaged in the detent notch 28 and the lever 10 becomes fully operational again. The lever 10 is thus not damaged by the disengagement.

From the above explanation of the lever 10, it will be clear that the lever together with the spring-loaded pin 30 that co-operates with the detent notch 28 comprises a detent element that forms a disconnecting device 28, 30 of the lever 10.

Figure 2:
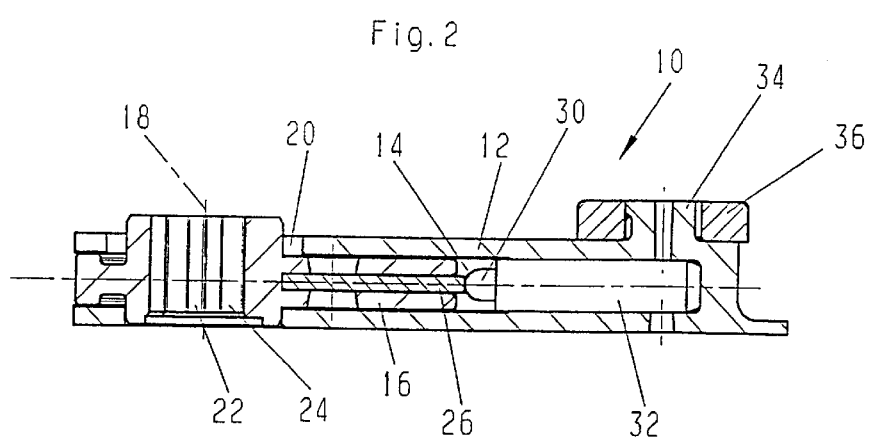
FIG. 2 is a longitudinal section through the lever of FIG. 1; along line II—II in FIG. 3.
Figure 3:
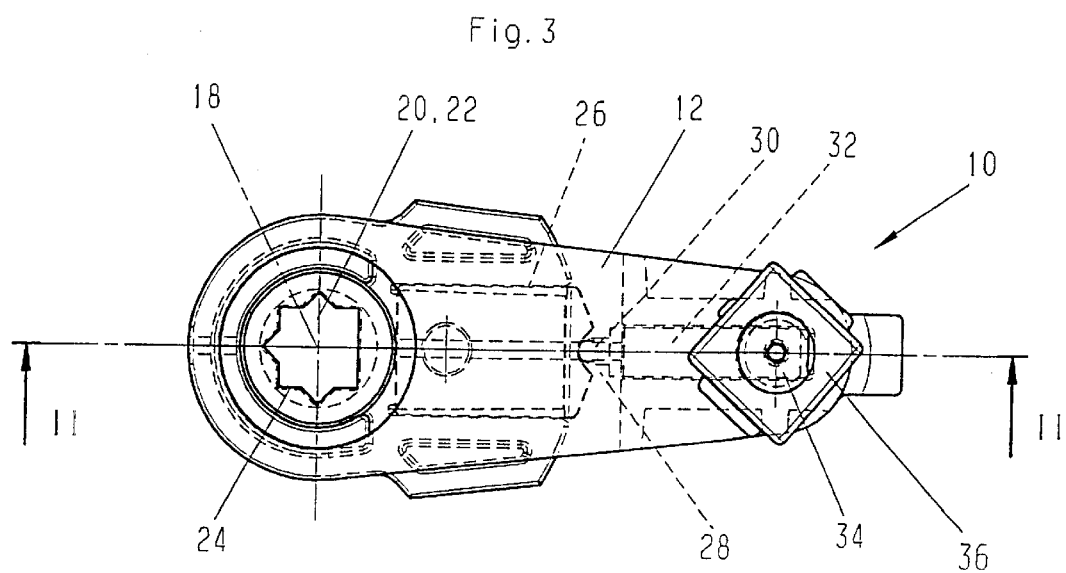
FIG. 3 is a plan view of the lever of FIG. 1.

FIG. 4 shows the use of the lever 10 from FIGS. 1 to 3 as a component of a drive according to the invention. In the embodiment shown, the drive according to the invention serves to open and close a compartment, for example a storage compartment (glove compartment) or a compartment for the installation of a car radio, CD player or the like. The compartment has a cub-like housing 38 of rectangular cross-section. The housing 38 is designed to be installed, for example, in a dashboard of a motor vehicle (not shown). The housing 38 is open at the front side and can be closed by a cover member 40. Inside the cover member 40 there can be inserted operating elements, such as, for example, switches for a seat-heating system, a warning light system or instruments (not shown), which are accessible and readable when the cover member 40 is closed as well as when it is open. The closed position of the cover member 40 is indicated in FIG. 4 by a continuous line, and the open position of the cover member 40 is shown by a dash-dot line.

An insert 42 is arranged in the housing 38 to be displaceable in the manner of a drawer. The insert 42 has a base 44 and side walls 46, one of which side walls 46, remote from the observer, is visible because of the cut-away representation in the left-hand portion of FIG. 4.

Below the base 44 of the insert 42, the lever 10 is arranged in an opening 48 in a housing floor 50. The opening 48 gives the lever 10 space to pivot As described for FIGS. 1 to 3, the lever 10 together with its coupling lever 16 is positioned on a gear shaft 52 to rotate conjointly therewith. The gear shaft 52 has a serrated profile complementary to the serrated profile of the lever 10. In order to pivot the lever 10, there is arranged on the underside of the housing floor 50 an electric motor 54 having flanged-on gears 56, from which there projects the gear shaft 52, by means of which the lever 10 can be pivoted. The lever 10 rests by its sliding block 36 in a sliding block seat in the base 44 of the insert 42, the sliding block seat being rectanglular in plan view, so that the sliding block 36 can move sideways relative to the insert 42, that is to say transverse to the direction of displacement. By pivoting the lever 10, the insert 46 is moved translationally and is moved forwards and backwards in the housing 38, that is to say to the right and left in the drawings.

The cover member 40 has arms 58, each arranged laterally on the insides of the side walls 46 of the insert 42. The arms 58 of the cover member 40 have holes, by means of which they are positioned on pins 60 that project inwards from the side walls 46 of the insert 42. The insert 42 forms a path transmission element of the drive according to the invention, which path transmission element transmits the drive movement of the electric motor 54 having the flanged-on gears 56 by way of the lever 10 to the arms 58 of the cover member 40.

The arms 58 of the cover member 40 have outwardly projecting sliding pins 62 which lie in sideways 64 in side walls 66 of the housing 38. Since the front portion of the housing 38, which is on the right in FIG. 4, is shown in elevation, in the front region 38 of the housing 38 the side wall 66 thereof that faces the observer is seen in elevation from the outside. The sliding pin 62 of the arms 58 of the cover member 40 engages through openings (not visible in the drawing) in the side walls 46 of the insert 42. The sliding pins 62 are arranged spaced at a distance in front of and below the pins 60 that project inwards from the side walls 46 of the insert 42 and on which the arms 58 of the cover member 40 are positioned to pivot. The slideways 64 extend in a curved line initially approximately parallel with the housing floor 50 and continue forwards/upwards in a curved line. w hen the insert 42 is displaced forwards, that is to say to the right in FIG. 4, by the electric motor 54 by way of the gears 56 and the lever 10, it moves the arms 58 of the cover member 40 forwards by way of the pins 60. As that happens, the sliding pins 62 of the arms 58 slide forwards and upwards in the slideways 64 so that the cover member 40 moves, as shown, from the closed position in which it closes the housing 38 that is open at the front side to an open position in front of the housing 38, above and oblique thereto. In the open position of the cover member 40, the housing 38 is accessible. When the insert 42 is pushed back into the housing 38 by the electric motor 54, the cover member 40 returns to its closed position in which it closes the housing 38.

If the drive of the lever 10, that is to say the electric motor 54 having the flanged-on gear 56, is not operational, for example as a result of a defect or power failure, the cover member 40 can be opened manually. This is done by pulling on the cover member 40 in the closed position of the cover member 40. By way of its arms 58, the cover member 40 draws the insert 42 in the housing 38 forwards. The lever 10 is thus pivoted forwards. As described in FIGS. 1 to 3, the spring-loaded pin 30 inside the base portion 12 of the lever 10 disengages from the detent notch 28 of the coupling lever 16 lying pivotably inside the base portion 12, as a result of which the base portion 12 that carries the sliding block 36 can pivot freely on the gear shaft 52. By pulling on the cover member 40, the lever 10 can be disengaged. To do so it is necessary initially to pull firmly on the cover member 40 in order to disengage the lever 10, and once the lever 10 has been disengaged, the cover member 40 can be moved easily.

In the event of the cover member 40 or the insert 42 becoming jammed and the electric motor 54 being actuated, the lever 10 disengages also as described, so that the motor 54 can turn and does not become overloaded. Once the fault has been overcome, the lever 10 is re-engaged by closing or opening the cover member 40 manually and is thus operational again.

It will be understood that each of the elements described above, or two or more together, may also find a useful application in other types of constructions differing from the types described above.

While the invention has been illustrated and described as embodied in drive for opening and closing a cover member in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cover device for a motor vehicle, comprising a cover member; an electric motor; a path transmission element which transmits a drive movement of said electric motor to said cover member; and a disconnecting device which disconnects said cover member from said motor when a predetermined force is exceeded, said path transmission element including a lever which converts a rotational movement of said electric motor into a translational movement for opening and closing said cover member, said lever including said disconnecting device, said lever including a detent element which disengages when a predetermined force is exceeded, said detent element including a detent body which is pressed into a detent notch by a spring element and is disengageable by overcoming a detent force.

2. A cover device as defined in claim 1; and further comprising an insert guidable displaceably by said electric motor, said insert forming said path transmission element, said cover member being connected pivotally to said insert, said cover member having a guiding element which moves said cover member when said insert is displaced to a pulled-out position.

3. A cover device as defined in claim 2, wherein said cover member has at least one arm which connects said cover member pivotably to said insert.

4. A cover device as defined in claim 2, wherein said cover member includes a slide-type guiding element.

5. A cover device as defined in claim 4, wherein said slide type guiding element includes a slideway which extends transversely to a direction of displacement of said insert.

* * * * *